Nov. 16, 1954   P. CHERIGIE   2,694,300
CONTROL MECHANISM
Filed Feb. 26, 1952
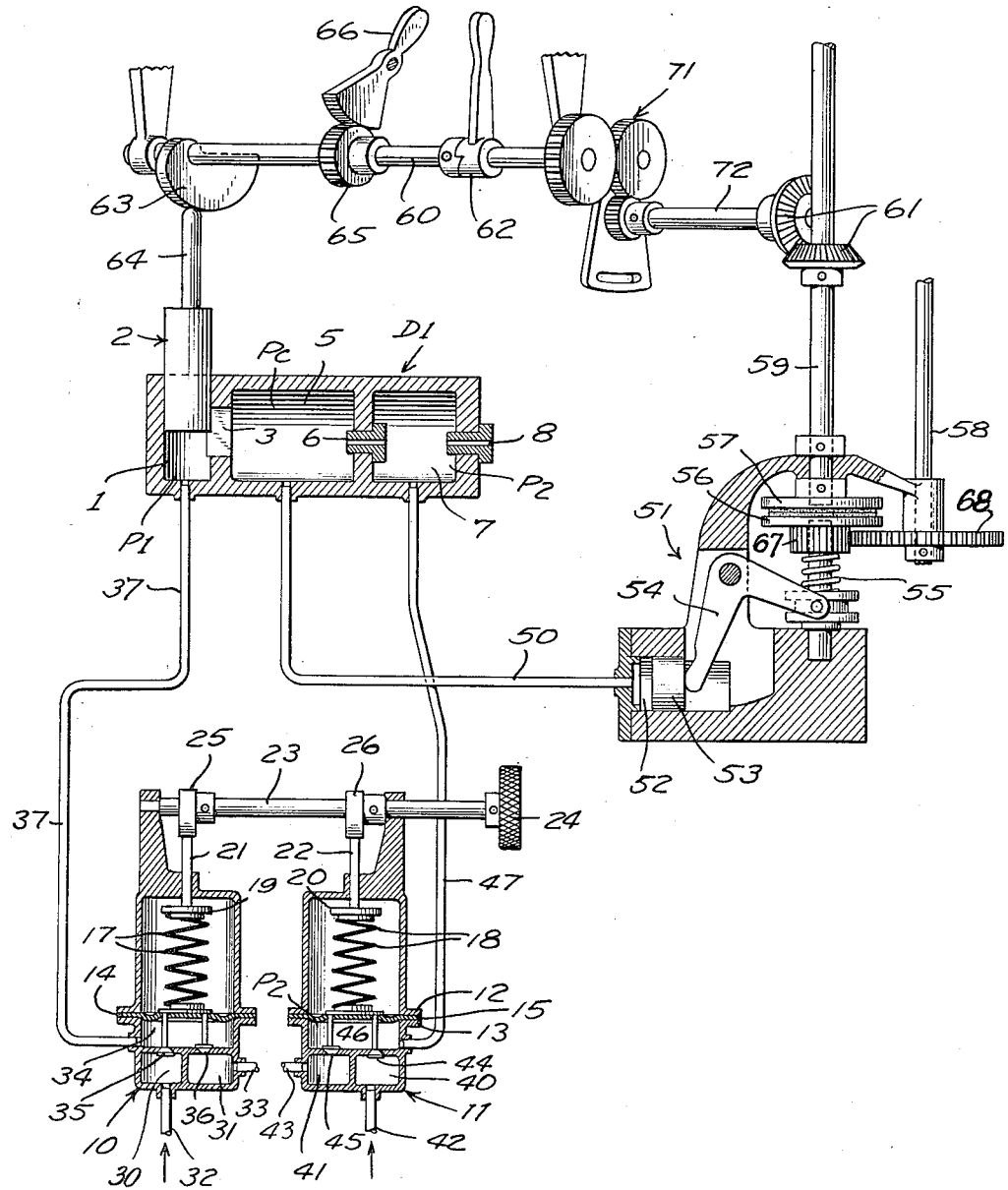
Inventor
PIERRE CHERIGIE
By
Attorney United States Patent Office 2,694,300
Patented Nov. 16, 1954

2,694,300

CONTROL MECHANISM

Pierre Cherigie, Paris, France, assignor to La Cellophane, Paris, France, a French company Application February 26, 1952, Serial No. 273,521

Claims priority, application France March 19, 1951

3 Claims. (Cl. 64—30)

This invention relates to control apparatus and particularly to apparatus for varying a plurality of variables in accordance with a common law while maintaining the values of the said variables in relatively the same proportion.

The said apparatus is of general utility and may be applied for example to the control of several temperatures or outputs which are variable in time, or of several tensions which vary as a function of the number of revolutions of a movable member. The values of the variables may be widely different and the factor by which they are to be varied may, in different cases, be of widely different level.

According to the present invention control apparatus for varying the value of a plurality of variables in relatively the same proportion and in accordance with a set law comprises:

(a) a compressed air distributor comprising as many identical units as the number of values to be regulated and of which each unit is composed of a cylinder having a piston-type valve closure member controlled by a cam common to all the units and a balancing chamber communicating by a nozzle with a back pressure chamber which itself communicates with the atmosphere.

(b) a double pressure reducer for each unit and having two opposed valves in each element of the pressure-reducer, the pressure-reducer being connected and arranged to determine the ratio between the pressures in the piston type valve cylinder and in the back pressure chamber; and (c) a pneumatic servo-motor connected to the balancing chamber of each unit.

In the following description, there is described more especially, but only by way of example, the application of the present invention to the control of a slitting machine for cutting continuous strips of cellulose film or similar material from a wide band thereof, in which the tension of each strip varies as a function of the effective diameter of the spool on which it is being wound, or of the number of revolutions made by the said spool since commencement of the winding operation.

One form of apparatus embodying the invention is illustrated diagrammatically in the drawing.

The apparatus comprises a pressure control unit D′, one such unit being used for each of the values which is to be varied in the given proportion. One unit D′ is shown for purposes of illustration. This unit comprises an air inlet valve chamber 1 having a cylindrical valve slide 2 therein which controls the opening 3 into a control pressure chamber 5. The control pressure chamber 5 communicates through an expansion valve 6 with a low pressure chamber 7 venting to the atmosphere through a discharge nozzle 8.

The valve plungers 2 of the different units are interdependent and their displacement is controlled as a unit by a member which is itself controlled by the factor on which the values to be regulated depend, as will be hereinafter explained.

A pressure control unit comprising a pair of cylinders 10 and 11 is adapted to produce controlled pressure for the valve chamber 1 and the low pressure chamber 7. Each cylinder 10, 11 is formed in two sections joined by flanges 12 and 13 with diaphragms 14 and 15 respectively clamped therebetween. The diaphragms 14 and 15 respectively are biased by springs 17 and 18 respectively, the tension of which is controlled by plungers 19 and 20 mounted on sliding rods 21 and 22. A shaft 23 having a knob 24 carries cams 25 and 26 which actuate the rods 21 and 22 respectively so that the two springs are controlled in unison while maintaining a fixed ratio therebetween.

The lower end of the cylinder 10 is divided into an inlet chamber 30 and an outlet chamber 31 connected respectively to a high pressure pipe 32 and a vent pipe 33. The chambers 30 and 31 communicate with an intermediate chamber 34 below the diaphragm 14 through ports closed by oppositely acting valves 35 and 36, which are connected to be actuated by the diaphragm 14 so that one valve is opened when the other valve is closed and vice versa. Hence by alternately connecting the intermediate chamber 34 to the high pressure 30 or the discharge pressure 31 an intermediate pressure is maintained the value of which is determined by the loading of the spring 17. The intermediate chamber 34 is connected by a pipe 37 to the valve chamber 1 to supply air at the pressure $p_1$ thereto.

In a similar way the lower end of the cylinder 11 is formed with inlet and outlet chambers 40 and 41 connected to high pressure pipe 42 and vent pipe 43 respectively and communication through ports controlled by oppositely acting valves 44 and 45 with an intermediate chamber 46 which is connected by a pipe 47 with the low pressure chamber 7. The valves 44 and 45 are actuated by the diaphragm 15 to maintain the chamber 46 at a pressure $p_2$ which is determined by the loading of the spring 18 and bears a definite relationship to the pressure $p_1$.

The position of the valve plunger 2 determines the pressure $p_c$ in the control pressure chamber 5. This chamber 5 is connected by a pipe 50 to a servo-motor 51 which acts on the value to be regulated, in this case the driving force for the spindles.

In the form shown the pipe 50 supplies control pressure $p_c$ to a cylinder 52 in which a piston 53 slides. The piston 53 acts on a bell crank lever 54, one arm of which controls the compression of a spring 55. The spring 55 determines the pressure on a disc 56 of a friction clutch comprising discs 56 and 57. The disc 56 constitutes the driving member. It is driven by pinion 67 and gear 68 from a power shaft 58. The disc 57 drives a drive shaft 59 which constitutes the driven member and drives the spindles (not shown) on which the spools are carried for winding.

The shaft 59 also drives a shaft 60 through bevel gears 61, countershaft 72, and reducing gears 71. The shaft 60 carries a cam 63 which, through a cam follower 64, actuates the valve plunger 2. A reset clutch 62, gear 65 and handle 66 facilitate resetting of the cam 63. The shaft 60 and cam 63 are geared to make one revolution while the shaft 59 makes the turns necessary for winding a full spool on the driven spindles, and the cam 63 shifts the valve plunger 2 from closed to open position during this period so as to vary the control pressure $p_c$ from a minimum to a maximum value which in turn causes the servo-motor 51 to continuously increase the driving friction of the friction clutch so as to increase the driving force on the spindles to compensate for the increased weight of the windings and maintain a constant tension on the strips being wound.

In a system having several units the pressures may be defined as P1 and P2 for the first unit, $\alpha$P1 and $\alpha$P2 for the second unit, $\beta$P1 and $\beta$P2 for the third unit, and so on. The pressures in the control pressure chambers may be defined as $P_c$, $\alpha P_c$, $\beta P_c$, and so on.

The coefficients $\alpha$, $\beta$, etc., are the coefficients of change of the different values, i. e. the factors by which P has to be multiplied. They result from the operation of the regulating member 24.

As the coefficients of change of the different values are thus fixed, these values vary in accordance with a single law, as a consequence of the combined movement of the valve plunger 2.

Slitting machines are intended to provide, starting from a roll of large width, a number of spools of smaller width. They are used in the paper industry, the synthetic film industry, and in other connections. Generally speaking, they comprise a plurality of winding spindles which carry the mandrels serving as hubs for the spools.

If, as is generally the case, the machine delivers the wide band at a constant linear speed and if it is desired to regulate the winding tension in accordance with a certain law, the driving torque to be exerted on each spool must vary in accordance with the increase in diameter of the latter as it becomes more fully wound. For this reason, the spools are usually driven via friction devices which are themselves driven by the winding spindle.

To regulate the winding tension, each friction device comprises a thrust member, generally a spring, of which the tension may be adjusted by a threaded ring or there is only one thrust member per winding spindle, which acts on all the friction devices of the spindle by means of cross members. In both cases, the regulation of the thrust on the friction devices is effected manually by the operator.

The present invention makes it possible to effect automatically the regulation of the thrust in accordance with a certain law, which will also be that according to which the winding tension will vary.

The thrust on the friction devices is controlled using one thrust member per winding spindle, acting on all the friction devices of the spindle, by a compressed air servo-motor as above described. As many servo-motors are employed as there are winding spindles.

On each winding spindle, the thrust must, on the one hand, be proportional to the total widths of the unwound band carried by this spindle and, on the other hand, must vary during winding in accordance with a definite law, this law being the name of the different winding spindles.

For a system having three winding spindles three units of the above type are used to drive three servo-motors which control the drag on the clutches driving the various spindles. The control pressures $p_c$ for the three servo-motors are controlled in unison by suitable valve plungers 2.

What is claimed is:
1. Apparatus for controlling the torque applied to a shaft, comprising a driven shaft, a power shaft, a friction clutch having adjusting means for adjusting the friction drag thereof interconnecting said power shaft and said driven shaft, control means including a piston responsive to fluid pressure for adjusting the friction drag of said friction clutch, a cam actuated by said driven shaft to make a single revolution during a predetermined number of revolutions of said driven shaft, means supplying fluid under pressure to actuate said piston comprising a pressure control means actuated by said cam to vary said fluid pressure in accordance with the movement of said cam, whereby the friction drag of said clutch is caused to vary as a function of the movement of said cam and the torque of said driven shaft is thus caused to vary as a function of the number of revolutions of said driven shaft.

2. Apparatus, as set forth in claim 1, in which said control valve comprises a high pressure chamber, a low pressure chamber and a control pressure chamber, a slide controlling the supply of fluid from said high pressure chamber to said control pressure chamber, a port connecting said low pressure chamber and said control pressure chamber, means controlled by said cam to actuate said slide to vary thereby the pressure built up in said control pressure chamber, said control pressure chamber being connected to supply fluid pressure to said piston for thereby varying said friction drag.

3. An apparatus, as set forth in claim 2 in which said means for supplying fluid under pressure comprises a pair of chambers having spring loaded diaphragms therein, means including a pressure source and oppositely acting inlet and exhaust valves actuated by said diaphragms to maintain said last chambers at fixed but different pressures determined by said spring loadings, means connecting said pair of chambers to said high and low pressure chambers respectively, and means varying said spring loadings on said diaphragms in unison while maintaining the same ratio therebetween.

References Cited in the file of this patent
UNITED STATES PATENTS

| Number | Name | Date |
|---|---|---|
| 2,401,982 | Springhorn | June 11, 1946 |
| 2,533,307 | Amos et al. | Dec. 12, 1950 |